D. DU BOE.
LEMON SQEEZER.
APPLICATION FILED FEB. 7, 1917.
1,234,146.
Patented July 24, 1917.
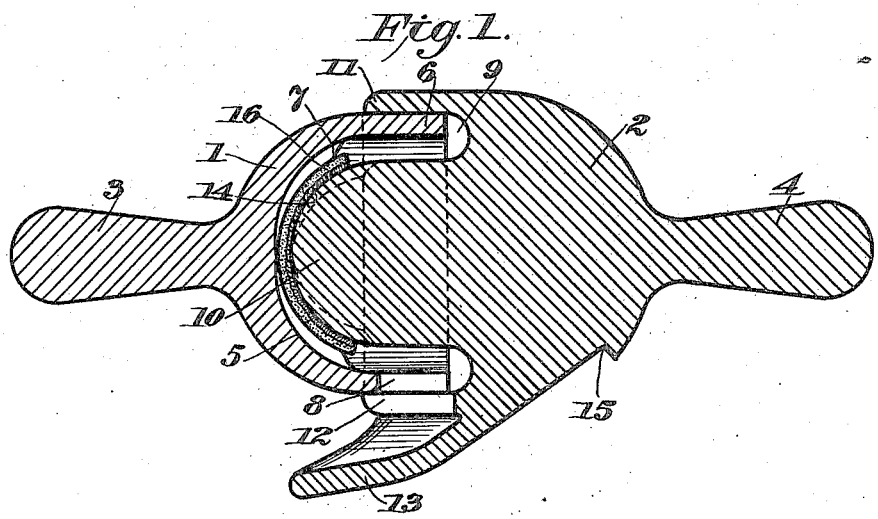
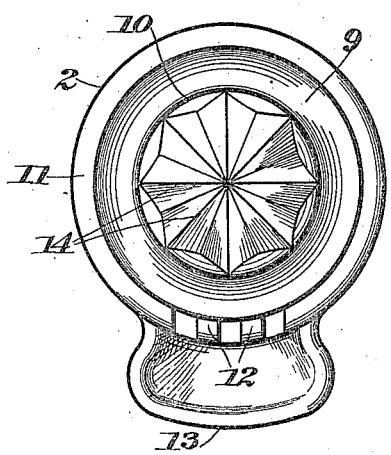
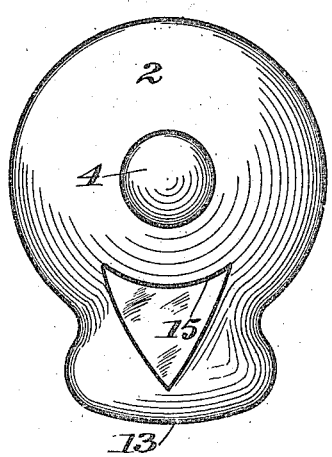
Inventor
Domingue Du Boe
By Frederick V. Winters
Attorney

UNITED STATES PATENT OFFICE.

DOMINIQUE DU BOE, OF NEW YORK, N. Y.

LEMON-SQUEEZER.

1,234,146.   Specification of Letters Patent.   Patented July 24, 1917.

Application filed February 7, 1917. Serial No. 147,115.

*To all whom it may concern:*

Be it known that I, DOMINIQUE DU BOE, a citizen of the United States, residing at New York city, county and State of New York, have invented certain new and useful Improvements in Lemon - Squeezers, of which the following is a full, clear, and exact specification.

This invention relates to lemon squeezers, and has for its object to provide an improved device of this kind which may be easily operated by hand and which will effectively extract all of the juice from the fruit and discharge the same into a receptacle without danger of waste or splashing. A special object is to provide a two-part lemon squeezer, one part of which fits for easy rotation in the other part, whereby said parts are always retained in proper relation to best act upon the lemon. Another special object is to provide means for resting one part of the device on the edge of a receptacle or stationary article while said device is being used.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:

Figure 1 is a central longitudinal section through both parts of the device assembled, one end of a lemon being shown between said parts.

Fig. 2 is an inner end view of the right hand member of the device, and

Fig. 3 is an outer end view of the same part.

The device comprises two supplemental parts 1 and 2 having handles 3 and 4 respectively. The part 3 has a cavity 5 surrounded by an annular wall 6 in the lower portion of which one or more slots 8 are formed. In the base of the cavity 5 ridges 7 are formed, preferably in the general shape of a star, although their shape may be varied if desired.

The part 2 has a central rounded knob or protuberance 10 adapted to extend into the cavity 5 in the part 1 and spaced from the walls 6 of said cavity. The end of the knob or protuberance 10 has ridges 14 formed thereon corresponding to the ridges in the base of the cavity 6, the purpose of the ridges on both parts being to grip the piece of lemon 16 and thoroughly extract all the juice therefrom as will be readily understood.

The part 2 also has an annular flange 11 adapted to fit around the margin of the annular flange 6 of the part 1. Between the knob 10 and annular flange 11 there is an annular space or groove 9 in the part 2 into which the flange or wall 6 of the part fits, as illustrated in Fig. 1, when the device is in operation. The flange 11 is provided with a series of slots 12 at the bottom to register with the opening or openings 8 for permitting the escape of the juice which is extracted from the lemon 16 by pressing the two parts of the device together and giving them a slight rotary motion. Below the slots 12, the part 2 is provided with a delivery spout 13 for directing the juice into any desired receptacle.

Either or both parts of the device may be made of glass, aluminum or other suitable material, and each part is preferably made in a single integral piece. The part 2 may be formed with a flattened portion 15, generally triangular in outline, on the base thereof, as illustrated in Figs. 1 and 3, providing a shoulder adapted to engage the edge of a receptacle or other article for supporting this part of the device, if desired, during the operation of the squeezer.

Having thus described my invention, what I claim as new and desire to secure by Letters Patent of the United States is:—

1. A lemon squeezer comprising two parts, one having a cavity in one end and a handle at the other end thereof, the other part having a handle at one end and a knob at the other end adapted to fit loosely in the cavity of the first part, and an annular flange on the knob-carrying part to fit closely around the cavity-containing end of the other part when the knob is engaged with the cavity.

2. A lemon squeezer comprising two parts, one having a cavity in one end and a handle at the other end thereof, the other part having a handle at one end and a knob at the other end adapted to fit loosely in the cavity of the first part, and an annular flange on the knob-carrying part to fit closely around the cavity-containing end of the other part when the knob is engaged with the cavity, there being openings in said flange and the overlapped portion of the cavity-containing part to permit the escape of the juice.

In testimony whereof I have signed my name to this specification.

DOMINIQUE DU BOE.